United States Patent
Kato et al.

(10) Patent No.: US 6,885,823 B2
(45) Date of Patent: Apr. 26, 2005

(54) WAVELENGTH MULTIPLEXING/ DEMULTIPLEXING UNIT, WAVELENGTH MULTIPLEXING/DEMULTIPLEXING APPARATUS AND WAVELENGTH MULTIPLEXING/DEMULTIPLEXING METHOD

(75) Inventors: Kuniharu Kato, Ibaraki-ken (JP); Yasufumi Yamada, Mito (JP); Taisuke Oguchi, Mito (JP); Tatsuo Izawa, Musashino (JP)

(73) Assignee: NTT Electronics Corporation, Tokyo (JP)

( * ) Notice: Subject to any disclaimer, the term of this patent is extended or adjusted under 35 U.S.C. 154(b) by 0 days.

(21) Appl. No.: 10/441,038

(22) Filed: May 20, 2003

(65) Prior Publication Data

US 2003/0202742 A1 Oct. 30, 2003

Related U.S. Application Data

(63) Continuation of application No. 09/776,772, filed on Feb. 6, 2001, now abandoned.

(30) Foreign Application Priority Data

Feb. 7, 2000 (JP) ..................................... 2000-028528

(51) Int. Cl.[7] ............................ H04J 14/02; G02B 6/34
(52) U.S. Cl. ............................ 398/68; 398/48; 398/82; 385/24; 385/37
(58) Field of Search ............................. 385/24, 37, 39; 359/127, 130; 398/48, 68–69, 82

(56) References Cited

U.S. PATENT DOCUMENTS

| | | | |
|---|---|---|---|
| 5,077,483 A | | 12/1991 | Cloonan et al. |
| 5,680,490 A | * | 10/1997 | Cohen et al. ................. 385/24 |
| 5,745,612 A | | 4/1998 | Wang et al. |
| 6,069,990 A | * | 5/2000 | Okawa et al. ................. 385/43 |
| 6,208,444 B1 | * | 3/2001 | Wong et al. ................... 398/9 |
| 6,298,187 B1 | * | 10/2001 | Waarts et al. ................ 385/37 |

FOREIGN PATENT DOCUMENTS

| | | |
|---|---|---|
| CA | 2129292 | 2/1995 |
| CA | 2270053 | 4/1999 |
| CA | 2299441 | 1/2000 |
| KR | 10-0212350 | 7/1997 |
| KR | 10/0149858 | 6/1998 |
| WO | 99/42875 | 8/1999 |

OTHER PUBLICATIONS

Optical add Drop multiplexer 90ADM) Modules brochure by OPLINK Communications. The publication is cited in the body of the specification along with a statement of relevancy. 14 pages.
Takada, et al., "320–channel multiplexer consisting of 100 GHz–spaced parent AWG and 10 GHz–spaced subsidiary AWGs," Electronics Letters May 13th 1999, vol. 35, N0. 10.
Canadian Office Action, dated May 20, 2004.
Korean Office Action, dated May 28, 2004.

* cited by examiner

*Primary Examiner*—Akm Enayet Ullah
*Assistant Examiner*—Jerry T Rahll
(74) *Attorney, Agent, or Firm*—Pillsbury Winthrop LLP

(57) ABSTRACT

An optical multiplexing/demultiplexing apparatus in which a plurality of optical multiplexing/demultiplexing units operating in different wavelength bands are connected hierarchically. Each of the plurality of optical multiplexing/ demultiplexing units includes an input waveguide for receiving wavelength multiplexed optical waves, a filter for separating the wavelength multiplexed optical wave from the input waveguide into a first optical wave in a corresponding operating wavelength band and a second optical wave in the other wavelength bands. Each of the multiplexing/demultiplexing units also includes an AWG optical multiplexer/demultiplexer for separating the first optical wave from the filter into individual optical waves each of a single wavelength, and a branch waveguide for directing the second optical waves from the filter to an input waveguide of a succeeding optical multiplexing/ demultiplexing unit.

21 Claims, 10 Drawing Sheets

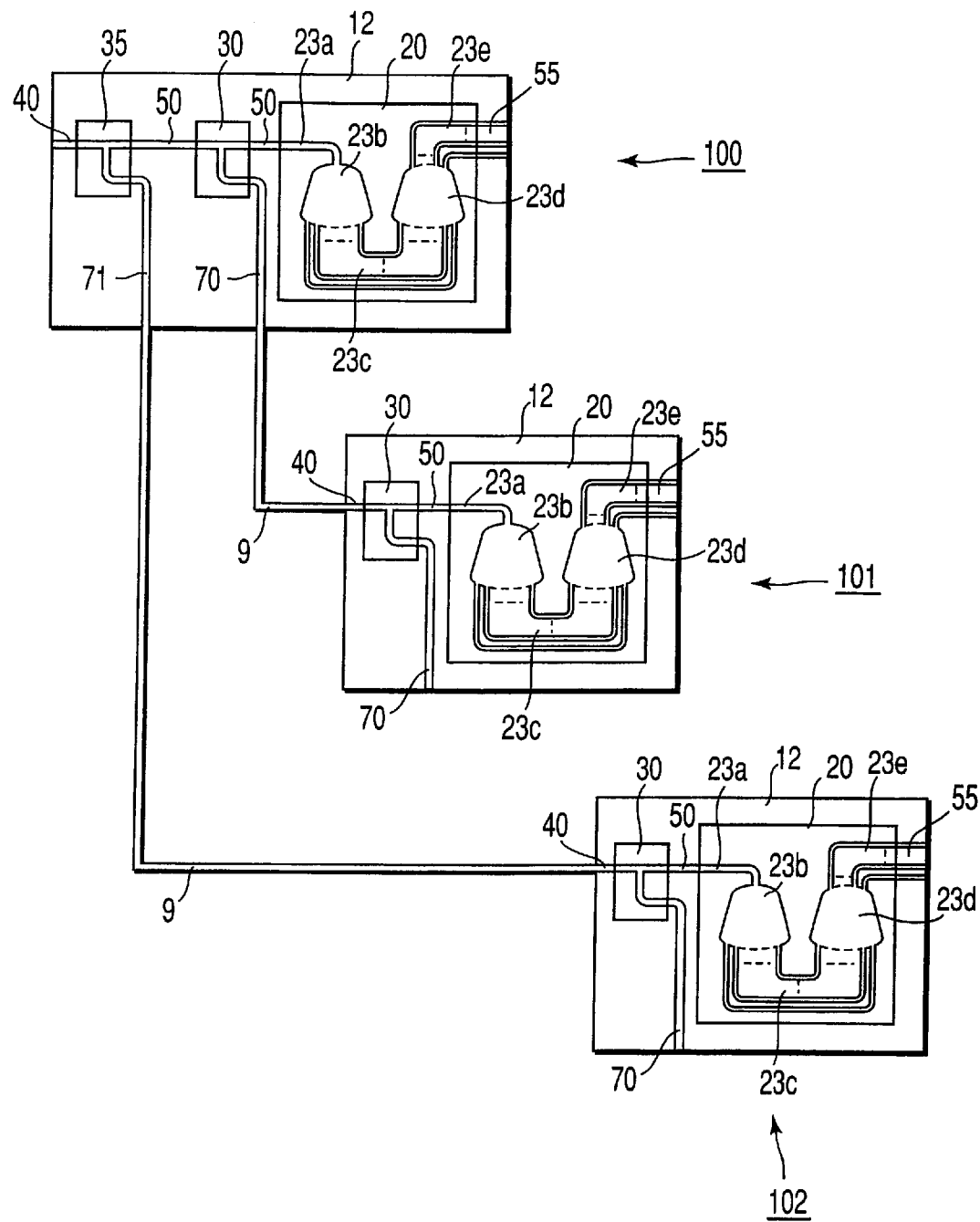
F I G. 12B

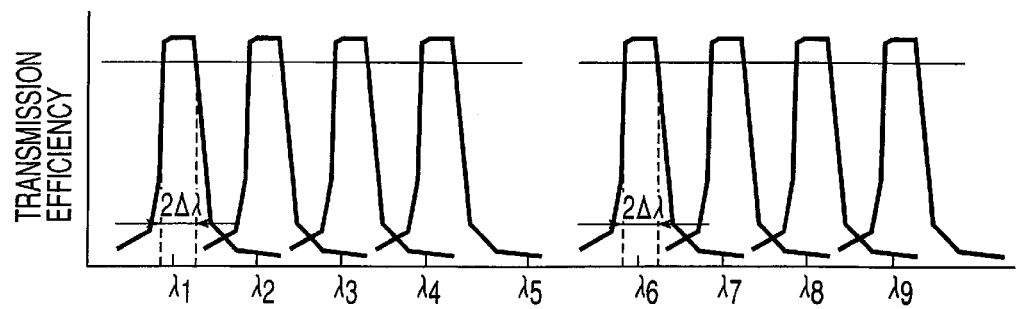
F I G. 17A
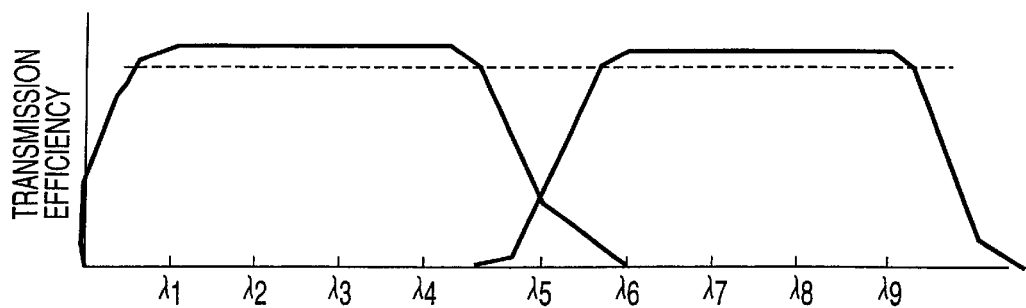
F I G. 17B

WAVELENGTH MULTIPLEXING/DEMULTIPLEXING UNIT, WAVELENGTH MULTIPLEXING/DEMULTIPLEXING APPARATUS AND WAVELENGTH MULTIPLEXING/DEMULTIPLEXING METHOD

CROSS-REFERENCE TO RELATED APPLICATIONS

This application is based upon and claims the benefit of priority from the prior Japanese Patent Application No. 2000-028528, filed Feb. 7, 2000, the entire contents of which are incorporated herein by reference.

BACKGROUND OF THE INVENTION

The present invention relates to a wavelength multiplexing/de multiplexing unit, a wavelength multiplexing/de multiplexing apparatus and a wavelength multiplexing/de multiplexing method which are available for optical communications or the like.

Wavelength division multiplexing (WDM) is a technique of combining a plurality of optical waves of different wavelengths for transmission over a single optical fiber and used to expand the transmission capacity of trunk lines of the Internet or the like.

A wavelength multiplexing/demultiplexing circuit plays a key role in WDM. That is, the wavelength multiplexing/demultiplexing circuit is a device arranged to combine a plurality of optical waves of different wavelengths at the transmitting end and a separating wavelength multiplexed optical wave at the receiving end.

For example, an arrayed waveguide grating (AWG) circuit, which is a conventional wavelength multiplexing/demultiplexing circuit, separates components of a multiplexed optical wave in the following manner:

That is, a wavelength multiplexed optical wave is input to the arrayed waveguide grating circuit through its input port and is then caused to pass through a plurality of (say, m) waveguides arranged in an array, whereby the multiplexed optical wave is separated into n components (optical waves) each having a single wavelength. Each of the optical waves with a different wavelength is output from a corresponding respective one of n output ports. The AWG circuit thus arranged is allowed to multiplex optical waves of different wavelengths the number of which is usually 30 to 60.

Recently, demands for optical communications have been remarkable and it is therefore required to further increase the number of channels.

However, an attempt to increase the number of channels with the conventional wavelength multiplexing/demultiplexing system would require the development of a new wavelength multiplexing/demultiplexing circuit having more arrayed waveguides. The development and manufacture of such a wavelength multiplexing/demultiplexing circuit require sophisticated techniques, which will result in very costly devices. In addition, the use of the new wavelength multiplexing/demultiplexing circuit would force the exchange of existing facilities including peripheral equipment, increasing the economical burden on users.

On the other hand, an arrangement has been proposed which increases the number of channels through the use of a number of multiplexers/demultiplexers using dielectric interference filters (for instance, DWDM components brochure by JDS FITEL, Dense wavelength Division Multiplexers (DWDM) Modules brochure by OPLINK COMMUNICATIONS). This arrangement is upgraded up to 16 or 40 channels with an eight-channel multiplexers/demultiplexers as one unit. Each unit is constructed by connecting, in stages, three-port multiplexers/demultiplexers using dielectric interference filters (for instance, Optical Add Drop multiplexers (OADM) Modules brochure by OPLINK COMMUNICATIONS). In this arrangement, a three-port multiplexer/demultiplexer is used for each channel so that the succeeding channel suffers reflection loss from the preceding three-port multiplexer/demultiplexer cumulatively.

From this reason, each channel suffers more transmission loss than the preceding one, thus, in the multiplexing/demultiplexing unit, the transmission loss varies greatly from channel to channel use is, therefore, at most 8 or 16. Even in multichannel arrangement in which the units are connected in stages the maximum increased number of channels is limited to at most 40 or 64.

BRIEF SUMMARY OF THE INVENTION

It is an object of the present invention to provide a wavelength multiplexing/demultiplexing unit, a wavelength multiplexing/demultiplexing apparatus and method which permit the number of channels to be increased readily at low cost.

To achieve the above object, according to the first aspect of this invention, there is provided an optical multiplexing/demultiplexing unit comprising a first waveguide for receiving a wavelength multiplexed optical wave; filter means optically connected with the first waveguide for separating the wavelength multiplexed optical wave from the first waveguide into a first optical wave in a first wavelength band and a second optical wave in a second wavelength band; means for optical-demultiplexing the first optical wave in the first wavelength band into optical waves each of a single wavelength; and a second waveguide for directing the second optical wave in the second wavelength band to a succeeding optical means.

To achieve the above object, according to the second aspect of this invention, there is provided an optical multiplexing/demultiplexing unit comprising: a first waveguide for receiving a wavelength multiplexed optical wave; first filter means optically connected with the first waveguide for separating the wavelength multiplexed optical wave from the first waveguide into a first optical wave in a first wavelength band and a second optical wave in a second wavelength band; second filter means optically connected with the first filter means for separating the first optical wave in the first wavelength band from the first filter means into a third optical wave in a third wavelength band and a fourth optical wave in a fourth wavelength band; means for optical-demultiplexing the third optical wave in the third wavelength band from the second filter means into optical waves each of a single wavelength; a second waveguide for outputting the second optical wave in the second wavelength band from the first filter means to a succeeding optical means; and a third waveguide for outputting the fourth optical wave in the fourth wavelength band from the second filter means to a succeeding optical means.

To achieve the above object, according to the third aspect of this invention, there is provided an optical multiplexing/demultiplexing unit comprising a substrate; a first cladding layer stacked on the substrate; a core layer stacked on the first cladding layer; a second cladding layer stacked on the core layer; and the core layer including: a first waveguide for receiving a wavelength multiplexed optical wave; filter means optically connected with the first waveguide for separating the wavelength multiplexed optical wave from the first waveguide into a first optical wave in a first wavelength band and a second optical wave in a second wavelength band; means for optical-demultiplexing the first optical wave in the first wavelength band into optical waves each of a single wavelength; and a second waveguide for directing the second optical wave in the second wavelength band to a succeeding optical means.

To achieve the above object, according to the fourth aspect of this invention, there is provided an optical multiplexing/demultiplexing apparatus comprising: a plurality of optical multiplexing/demultiplexing units which are different from one another in operating wavelength band are connected hierarchically, wherein each of the optical multiplexing/demultiplexing units is according to one of the optical multiplexing/demultiplexing units.

To achieve the above object, according to the fifth of this invention, there is provided an optical multiplexing/de multiplexing apparatus in which a plurality of optical multiplexing/de multiplexing units which are different from one another in operating wavelength band are connected hierarchically, each of the optical multiplexing/de multiplexing units comprising: a first waveguide for receiving a wavelength multiplexed optical wave; filter means optically connected with the first waveguide for separating the wavelength multiplexed optical wave from the first waveguide into a first optical wave having the corresponding operating wavelength band and a second optical wave having the other wavelength bands; means for optical-demultiplexing the first optical wave from the filter means into optical waves each of a single wavelength; and a second waveguide for directing the second optical wave from the filter means to a first waveguide of a succeeding optical multiplexing/demultiplexing unit.

To achieve the above object, according to the sixth of this invention, there is provided a method of demultiplexing an incident wavelength multiplexed optical wave in steps into different wavelength bands comprising: a first step of separating the wavelength multiplexed optical wave into a first optical wave in a first wavelength band and a second optical wave in a second wavelength band and then demultiplexing the first optical wave in the first wavelength band into individual optical waves each of a single wavelength; and a second step, which is repeated subsequent to the first step until all optical waves of different wavelengths contained in the wavelength multiplexed optical wave are separated, of separating the second optical wave in the second wavelength band into a wavelength multiplexed optical wave in a specific wavelength band and a optical wave in the remaining wavelength band and then demultiplexing the wavelength multiplexed optical wave in the specific wavelength band into individual optical waves.

To achieve the above object, according to the seventh of this invention, there is provided a method of demultiplexing an incident wavelength multiplexed optical wave into different wavelength bands comprising: a first step of separating the wavelength multiplexed optical wave into a first optical wave in a first wavelength band and a second optical wave in a second wavelength band by a first filter means, and then outputting the first optical wave to succeeding optical means and the second optical wave to a second filter means; a second step of separating the first optical wave from the first filter means into a third optical wave in a third wavelength band and a fourth optical wave in a fourth wavelength band by a second filter means, and then outputting the third optical wave to multiplexing/demultiplexing means and the fourth optical wave to succeeding optical means; and a third step of optical-demultiplexing the third optical wave into optical waves each of a single wavelength from the multiplexing/demultiplexing means.

With these configurations, a wavelength multiplexing/demultiplexing unit, a wavelength multiplexing/demultiplexing apparatus and method which permit the number of channels to be increased readily at low cost can be realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12B is a schematic diagram of the optical multiplexing/demultiplexing apparatus of the second embodiment;

FIGS. 16A, 16B, 17A and 17B are diagrams for use in explanation of the reason why lossy regions occur.

DETAILED DESCRIPTION OF THE INVENTION

Figure 1:
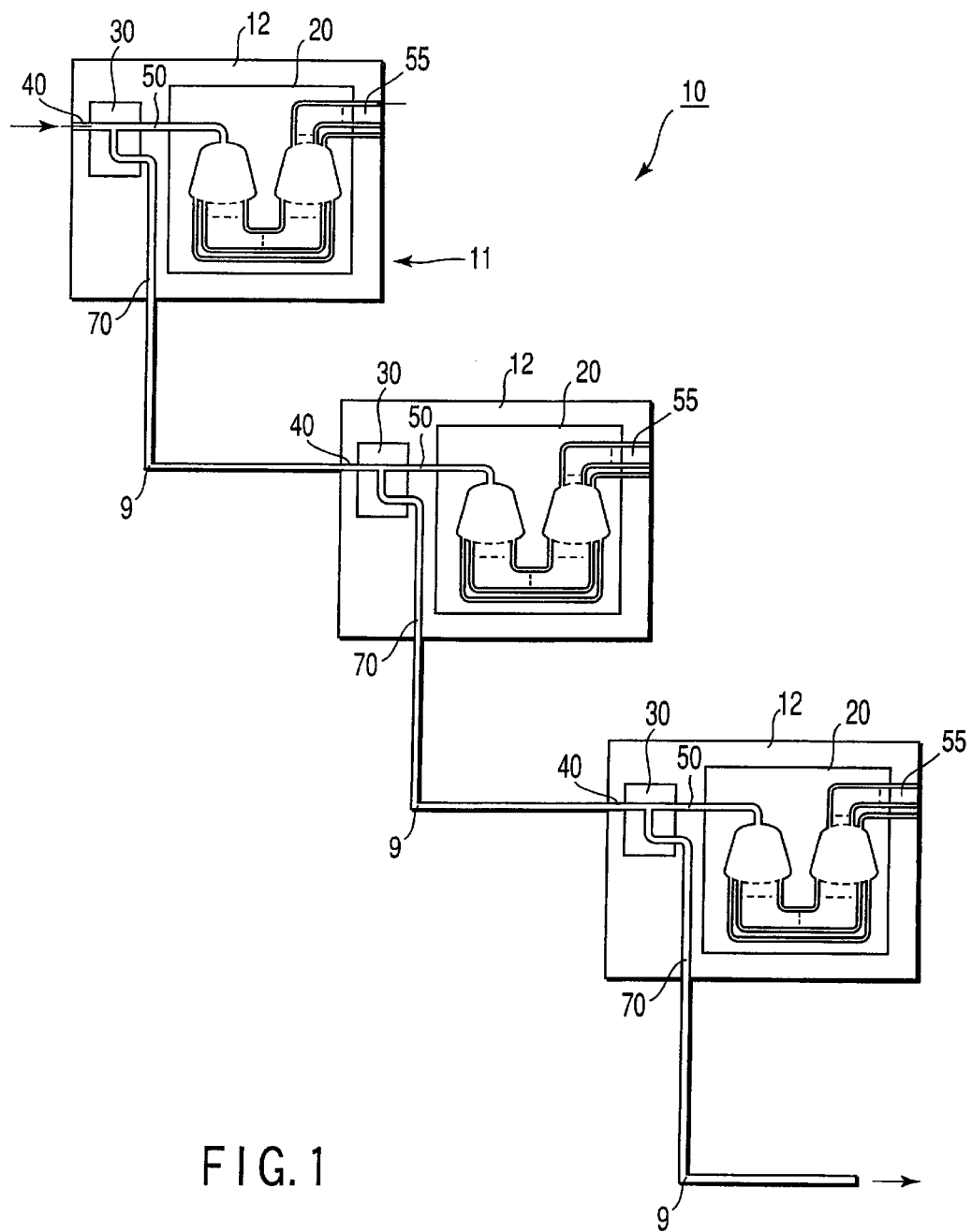
FIG. 1 is a schematic diagram of a optical multiplexing/demultiplexing apparatus 10 according to a first embodiment of the present invention.

Hereinafter, first through fourth embodiments of the present invention will be described with reference to the accompanying drawings. In the description below, like reference numerals and characters are used to designate corresponding parts throughout several views which have substantially the same function and arrangement and repeated descriptions thereof are given only when necessary.

Note that, in the description below, a optical wave of a predetermined single wavelength corresponds to a channel to carry the computer data or the like. In addition, a wavelength multiplexed optical wave corresponds to multi-channels to carry the computer data or the like.

(First Embodiment)

First, a description is given of a first embodiment of an optical multiplexing/demultiplexing of the present invention.

An important point of the optical multiplexing/demultiplexing apparatus of the present invention resides in an idea of combining or separating multi-channel optical waves by hierarchically connecting a plurality of optical multiplexing/demultiplexing units each of which combines or separates optical waves in different wavelength bands.

FIG. 1 shows a schematic arrangement of the optical multiplexing/demultiplexing apparatus 10 according to the first embodiment of the present invention. First, the schematic arrangement of the optical multiplexing/demultiplexing apparatus 10 will be described.

As shown in FIG. 1, the optical multiplexing/demultiplexing apparatus 10 has a plurality of optical multiplexing/demultiplexing units 11 connected in a hierarchical form by fiber 9.

Figure 2A:
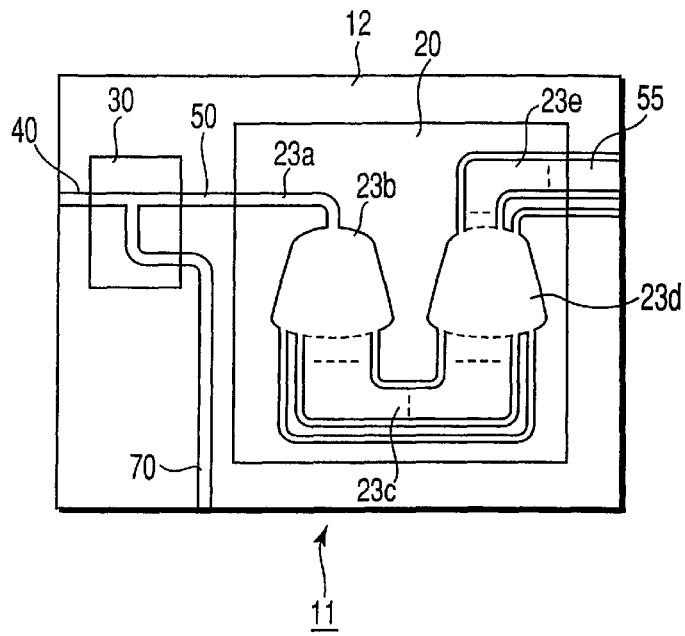
FIG. 2A is an enlarged view of a optical multiplexing/demultiplexing unit 11.

FIG. 2A is an enlarged view of the optical multiplexing/demultiplexing unit 11.

The optical multiplexing/demultiplexing unit 11 is constructed such that an AWG optical multiplexer/demultiplexer 20, a filter 30, an input waveguide 40, a coupling waveguide 50, output waveguides 55 and a branch waveguide 70 are connected optically and mounted on a separate board 12 made of plastic by way of example. Each of these components will be described below.

[AWG Optical Multiplexer/Demultiplexer]

The optical multiplexer/demultiplexer 20 is a device that wavelength-multiplexes optical waves by interference of light passing through tens to hundreds of arrayed waveguides (AWG waveguides) which are arranged in parallel and differ in optical path length by predetermined amounts. In addition, the optical multiplexer/demultiplexer 20 is also a device that demultiplexes a wavelength multiplexed optical wave by passing the AWG waveguides to optical waves each of which has a different wavelength. The optical multiplexer/demultiplexer 20 will be described in detail with reference to FIGS. 3 and 4.

Figure 3:
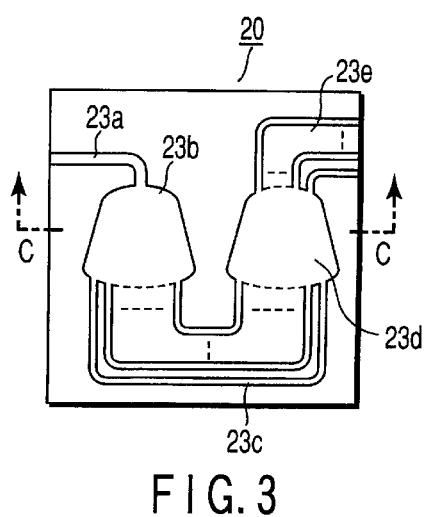
FIG. 3 is a diagram for use in explanation of the arrangement of the optical multiplexer/demultiplexer of the AWG type 20.
Figure 4:
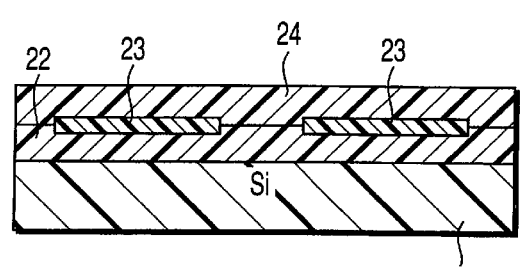
FIG. 4 is a sectional view taken along line C—C in FIG. 3.

FIG. 3 is a diagram for use in explanation of the schematic arrangement of the AWG optical multiplexer/demultiplexer 20. FIG. 4 is a sectional view taken along line C—C of FIG. 3.

As shown in FIG. 4, the AWG optical multiplexer/demultiplexer 20 has a stacked structure of a silicon substrate 21, a lower cladding layer 22, a core layer 23, and an upper cladding layer 24.

The lower cladding layer 22 and the upper cladding layer 24 are each made of silicon dioxide ($SiO_2$) and surround the core layer 23 to confine light.

The core layer 23 is a optical waveguide consisting of germanium-doped silicon dioxide. Light can be confined in the core layer 23 by making the index of refraction of the core layer 23 higher than those of the lower and upper cladding layers 22 and 24.

The core layer 23 is formed, as shown in FIG. 3, with an input planar waveguide 23a, an input slab waveguide 23b, AWG waveguides 23c, an output slab waveguide 23d, and output planar waveguides 23e. Each waveguide is formed by means of etching techniques.

The input planar waveguide 23a is a waveguide that propagates input a wavelength multiplexed optical wave to the input slab waveguide 23b.

The input slab waveguide 23b is a sector-shaped slab waveguide and functions as a lens. That is, the wavelength multiplexed optical wave directed to the input slab waveguide 23b spreads radially in that waveguide and are then taken into the AWG waveguides 23c.

The AWG waveguides 23c are arrayed waveguides in which tens to hundreds of optical waveguides whose optical path lengths differ by ΔL are arranged in the form of an array. A phase difference is produced between the optical waves that travel through each of the AWG waveguides 23c and the optical wave that travel through the adjacent one of the AWG waveguides, which is given by n·ΔL where n is the refractive index of the core layer 23. Thus, light rays directed from the AWG waveguides 23c to the output slab waveguide 23d are multiplexed optical waves displaced in phase by n·ΔL.

The output slab waveguide 23d is an inverse-sector-shaped waveguide. That is, light rays directed from the AWG waveguides 23c to the output slab waveguide 23d interfere with one another in the waveguide 23d, so that the light rays are separated into optical waves each with a single wavelength. Each of the resulting optical waves is directed to a corresponding one of the output waveguides 23e.

The output planar waveguides 23e direct the optical waves each with a single wavelength to the succeeding device.

In contrast to the above description, assuming that the optical waveguides 23e are on the light receiving side and the optical waveguide 23a is on the light outputting side, the AWG optical multiplexer/demultiplexer 20 will function as a multiplexer that combines optical waves.

[Filter]

The filter 30 is one which separates a wavelength multiplexed optical waves input from the input waveguide 40 into wavelength components to be separated by the optical multiplexer/demultiplexer in the corresponding optical multiplexing/demultiplexing unit 11 and wavelength components to be separated in the succeeding optical multiplexing/demultiplexing unit. For the filter 30, any of a highpass filter type of optical multiplexer/demultiplexer, a lowpass filter type of optical multiplexer/demultiplexer and a bandpass filter type of optical multiplexer/demultiplexer can be used as required.

As the highpass filter, the lowpass filter or the bandpass filter type of optical multiplexer/demultiplexer, use may be made of, for example, an interference film filter type of optical multiplexer/demultiplexer. Also, as the bandpass filter type of optical multiplexer/demultiplexer, use may be made of, for example, a directional coupler or a Mach-Zehnder interference optical multiplexer/demultiplexer. The directional coupler, the Mach-Zehnder interference optical multiplexer/demultiplexer and the interference film filter optical multiplexer/demultiplexer will be described hereinafter.

[Directional Coupler]

Figure 5:
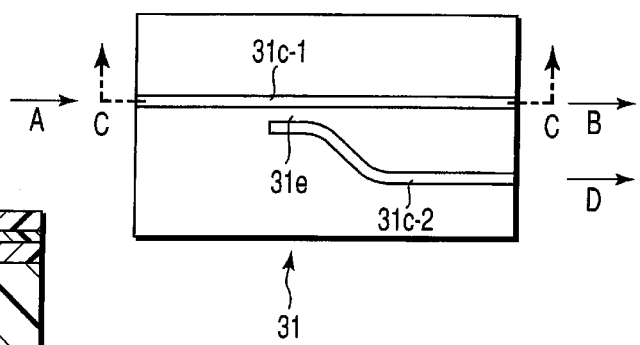
FIG. 5 is a top view of a general directional coupler.
Figure 6:
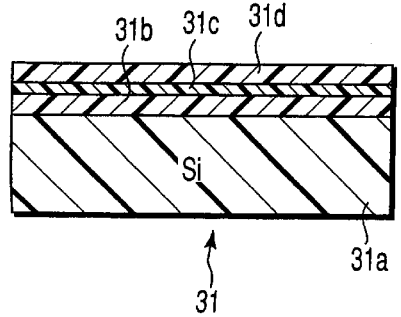
FIG. 6 is a sectional view taken along line C—C in FIG. 5.

The directional coupler is a device that separates optical waves using evanescent coupling. FIG. 5 is a top view of a general directional coupler, which is indicated generally at 31. FIG. 6 is a sectional view taken along line C—C of FIG. 5.

In FIGS. 5 and 6, the directional coupler 31 comprises a silicon substrate 31a, a lower cladding layer 31b, a core layer 31C, and an upper cladding layer 31d.

The lower and upper cladding layers 31b and 31d, consisting of silicon dioxide, are formed to surround the core layer 31c to serve the light confinement function.

The core layer 31c is a optical waveguide having first and second core layers 31c-1 and 31c-2 consisting of germanium-doped silicon dioxide. Light can be confined in the core layer 31c by making the refractive index of the core layer 31c higher than those of the lower and upper cladding layers 31b and 31d.

The directional coupler 31 has a coupling portion 31e in which the first and second core layers 31c-1 and 31c-2 are situated in close proximity to each other with a given spacing of, say, 10 μm or less. In this coupling portion, the so-called evanescent coupling occurs by which a optical wave that propagates through the first core layer 31c-1 shifts to the second core layer 31c-2. The length of the coupling portion 31e, i.e., the spacing between the first and second core layers, is called the coupling length. A sufficient coupling length to allow the shifting of optical waves is ensured.

In the directional coupler 31 thus constructed, a wavelength multiplexed optical wave input to the coupler 31 from the direction indicated by arrow A in FIG. 5 is separated by means of the evanescent coupling into an outgoing component that propagates through the first core layer 31c-1 along the direction indicated by arrow B and an outgoing component that propagates through the second core layer 31c-2 along the direction indicated by arrow D.

[Mach-Zehnder Interference Optical Multiplexer/Demultiplexer]

The Mach-Zehnder interference optical multiplexer/demultiplexer is a waveguide type of optical multiplexer/demultiplexer that splits an incoming optical wave into two optical waves in a directional coupler, then causes the optical waves to propagate through waveguides of different lengths and combines them again in the other directional coupler.

Figure 7:
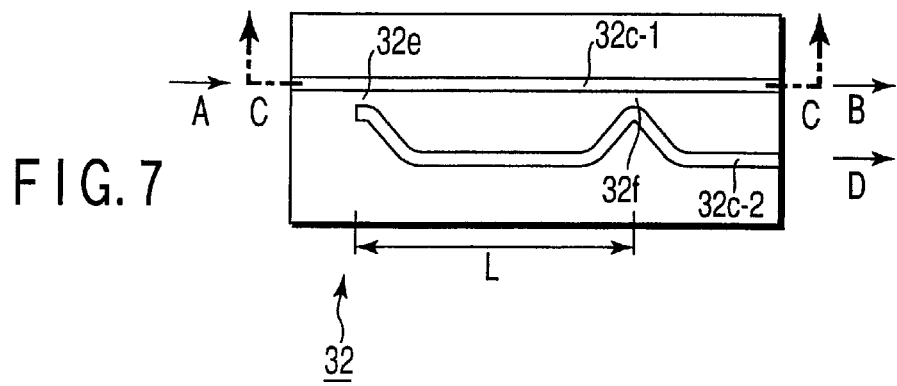
FIG. 7 is a top view of a optical multiplexing/demultiplexing circuit 32 of the Mach-Zehnder interference type.
Figure 8:
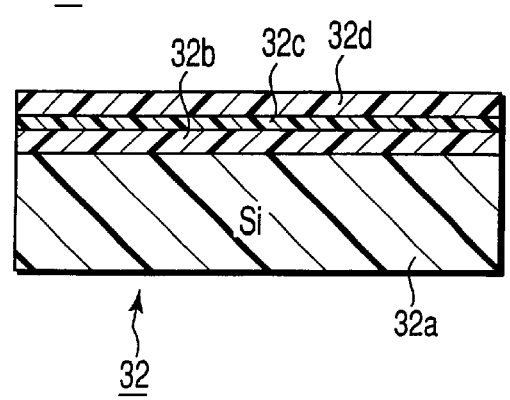
FIG. 8 is a sectional view taken along line C—C in FIG. 7.

FIG. 7 is a top view of a Mach-Zehnder interference optical multiplexer/demultiplexer, which is indicated generally at 32. FIG. 8 is a sectional view taken along line C—C of FIG. 7.

In FIGS. 7 and 8, the Mach-Zehnder interference optical multiplexer/demultiplexer 32 comprises a silicon substrate 32a, a lower cladding layer 32b, a core layer 32C, and an upper cladding layer 32d.

The lower and upper cladding layers 32b and 32d, consisting of silicon dioxide, are formed to surround the core layer 32c to serve the light confinement function.

The core layer 32c is a optical waveguide having first and second core layers 32c-1 and 32c-2 consisting of germanium-doped silicon dioxide. Light can be confined in the core layer 32c by making the refractive index of the core layer 32c higher than those of the lower and upper cladding layers 32b and 32d.

The Mach-Zehnder interference optical multiplexer/demultiplexer 32 has coupling portions 32e and 32f in which the first and second core layers 32c-1 and 32c-2 are situated in close proximity to each other with a given spacing of, say, 10 μm or less. In this coupling portion, the shift of optical waves between the first waveguides 32c-1 and 32c-2 occurs by the evanescent coupling.

The distance L between the coupling portions 32e and 32f is of the order of, say, 10 mm. The difference ΔL in optical path length between the first and second waveguides 32c-1 and 32c-2 over the distance L determines the spacing between wavelengths separated by the Mach-Zehnder interference optical multiplexer/demultiplexer 32. For example, by heating the second waveguide 32c-2 using a heater formed above the waveguide to change its refractive index and the optical path length difference ΔL, the wavelength spacing can be changed readily.

In the Mach-Zehnder interference optical multiplexer/demultiplexer 32 thus arranged, when a wavelength multiplexed optical wave is input to the directional coupler 31 from the direction of arrow A, a portion of the incoming signal shifts to the second waveguide 32c-2 in the coupling portion 32e. The optical path length difference causes the wavelength multiplexed optical wave that propagates through the second waveguide 32c-2 to have a phase difference with respect to the wavelength multiplexed optical wave that propagates through the first waveguide 32c-1. In the coupling portion 32f, the multiplexed optical wave are combined and then separated with high precision. As a result, each of separated waves is output as indicated by arrows B and D respectively.

[Interference Film Filter Type of Optical Multiplexer/Demultiplexer]

This type of optical multiplexer/demultiplexer utilizes the selective light-transmitting property of a dielectric interference film consisting of a composite film of, say, $TiO_2$ and $SiO_2$.

Figure 9:
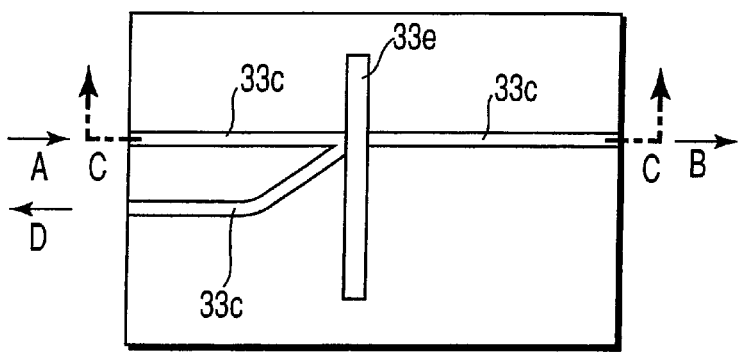
FIG. 9 is a top view of a optical multiplexing/demultiplexing circuit 33 of the interference filter type.
Figure 10:
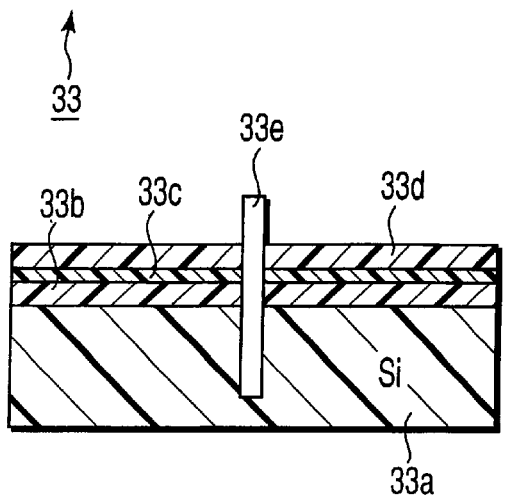
FIG. 10 is a sectional view taken along line C—C in FIG. 9.

FIG. 9 is a top view of an interference film filter type of optical multiplexer/demultiplexer, which is indicated generally at 33, and FIG. 10 is a sectional view along line C—C of FIG. 9.

In FIGS. 9 and 10, the optical multiplexer/demultiplexer 33 comprises a silicon substrate 33a, a lower cladding layer 33b, a core layer 33C, an upper cladding layer 32d, and a dielectric interference film 33e.

The lower and upper cladding layers 33b and 33d, consisting of silicon dioxide, are formed to surround the core layer 33c to serve the light confinement function.

The core layer 33c is a optical waveguide consisting of germanium-doped silicon dioxide. Light can be confined in the core layer 33c by making the refractive index of the core layer 33c higher than those of the lower and upper cladding layers 33b and 33d.

The dielectric interference film 33e has the property of selectively transmitting components of light and consists of a composite of a $TiO_2$ film of, say, 0.17 μm in thickness and an $SiO_2$ film of, say, 0.27 μm in thickness. In order for the dielectric interference film 33e to select light components correctly, it is required that the film be placed vertically with respect to the optical waveguide (i.e., the core layer 33c). For this reason, the dielectric interference film 33e is fitted into a groove formed in the silicon substrate 33a perpendicularly to the core layer 33c.

In FIG. 9, a wavelength multiplexed optical wave directed to the core layer 33c from the direction of arrow A is split by the dielectric interference film 33e. That is, a portion of the multiplexed optical wave is allowed to pass through the dielectric interference film 33e in the direction of arrow B, but the remaining portion is reflected back by the dielectric interference film 33e in the direction of arrow D.

In the optical multiplexing/demultiplexing unit 11, when the interference film type of optical multiplexing/demultiplexing circuit 33 is used as the filter 30, the multiplexed components allowed to pass through the dielectric interference film 33e are directed to the AWG optical multiplexer/demultiplexer 20. On the other hand, the multiplexed components reflected back by the dielectric interference film 33e are directed to the succeeding optical multiplexing/demultiplexing unit 11 via the branch waveguide 70.

So far, the directional coupler, the Mach-Zehnder interference optical multiplexing/demultiplexing circuit and the interference film type of optical multiplexing/demultiplexing circuit have been described in terms of the optical waveguide type. However, this does not mean that the filter 30 is limited to the optical waveguide type. For example, even if a WDM circuit consisting of a lens, an interference film, and an optical fiber is used as the filter, the object of the present invention can be attained.

[Input Waveguide and Output Waveguides]

The input waveguide 40 is a waveguide that directs an incident multiplexed optical wave to the filter 30.

The output waveguides 55 are waveguides of assembled type in which optical fibers corresponding in number to optical waves to be combined or separated (i.e., corresponding in number to channels) are arranged in a plane. Each of the optical waves, each of a single wavelength, separated in the AWG optical multiplexer/demultiplexer 20 is directed through the output planar waveguide 23e and a corresponding one of the output waveguides 55 to a corresponding one of light receiving modules (not shown), which correspond in number to channels.

[Coupling Waveguide and Branch Waveguide]

Returning now to FIG. 2A, we describe the arrangement of the optical multiplexing/demultiplexing unit 11.

The coupling waveguide 50 optically connects the filter 30 with the AWG optical multiplexer/demultiplexer 20. The components of the multiplexed optical wave allowed to pass through the filter 30 is directed via the coupling waveguide 50 to the AWG optical multiplexer/demultiplexer 20. The branch waveguide 70 optically connects the filter with the succeeding optical multiplexing/demultiplexing unit (i.e., the optical multiplexing/demultiplexing unit as the second stage when the optical multiplexing/demultiplexing unit 11 of FIG. 2A is taken as the first stage). The components of the multiplexed optical wave blocked in the filter 30 are directed via the coupling waveguide 70 to the succeeding optical multiplexing/demultiplexing unit 11.

Next, the operation of the optical multiplexing/demultiplexing unit 11 will be described.

Figure 2B:
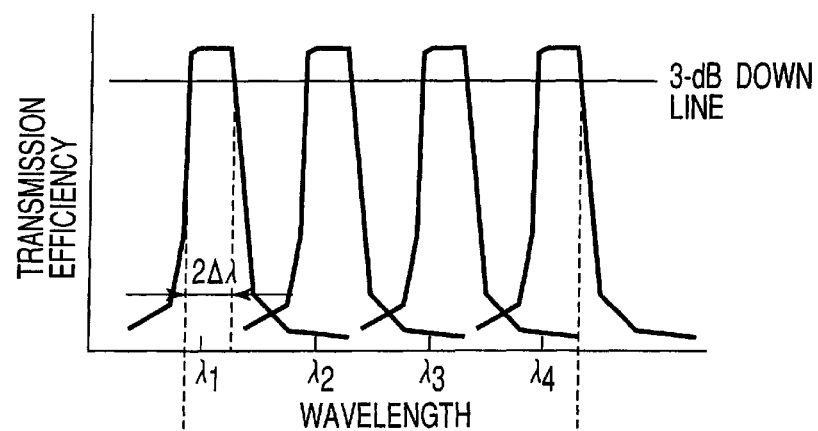
FIG. 2B shows the wavelength characteristic of the optical multiplexer/demultiplexer of the AWG type 20.

Suppose now that the AWG optical multiplexer/demultiplexer 20 separates four waves at center frequencies $\lambda 1, \lambda 2, \lambda 3$, and $\lambda 4$ with a channel width of $2\Delta\lambda$ and outputs them from the output planar waveguides 23e. The AWG optical multiplexer/demultiplexer 20 has such a wavelength characteristic as shown in FIG. 2B. The characteristic point of the wavelength characteristic, shown in FIG. 2B, is that the loss of each of the four waves, within in main operating wavelength band, is substantially uniform. Accordingly, the loss of each of the four waves in the optical multiplex/demultiplex apparatus 10 is also substantially uniform since the optical multiplex/demultiplex unit 11 incorporates the AWG optical multiplexer/demultiplexer 20 as a means for optical-demultiplexing.

Figure 2C:
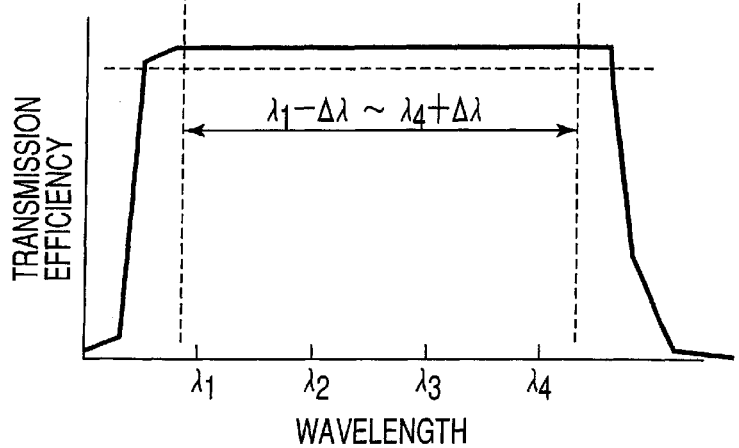
FIG. 2C shows the wavelength characteristic of an interference film used as the filter 30.

Also, suppose that the filter 30 shown in FIG. 2A is an interference film filter having such a wavelength characteristic as shown in FIG. 2C. That is, the filter 30, upon receiving a multiplexed signal containing four waves at center frequencies $\lambda 1, \lambda 2, \lambda 3$, and $\lambda 4$, outputs a optical wave having such a characteristic as shown in FIG. 2C to the coupling waveguide 50. As shown in FIG. 2C, the passband of the filter 30 is broader than the overall passband of the AWG optical multiplexer/demultiplexer 20 (i.e., the passband from $\lambda 1-\Delta\lambda$ to $\lambda 4+\Delta\lambda$) and loss within at least the overall passband of the AWG optical multiplexer/demultiplexer 20 is substantially constant.

The characteristic point of the wavelength characteristic shown in FIG. 2C is that optical waves separated by the AWG optical multiplexer/demultiplexer 20 and output from the output waveguides 23e are low in loss. The reason is that the optical multiplexing/demultiplexing apparatus 10 of the present invention is arranged such that optical waves to be output to the succeeding stage by the branch waveguide 70 pass through only the filter 30 (without passing through the AWG optical multiplexer/demultiplexer 20).

Suppose that a total of twelve multiplexed optical waves at central wavelengths $\lambda 1, \lambda 2, \lambda 3, \lambda 4, \lambda 5, \ldots, \lambda 12$ (arranged in the order of increasing wavelength) is directed to the input waveguide 40 of the first-stage optical multiplexing/demultiplexing unit 11. Then, the filter 30 allows four signals at wavelengths $\lambda 1, \lambda 2, \lambda 3$, and $\lambda 4$ to pass through and directs them to the AWG optical multiplexer/demultiplexer 20. The AWG optical multiplexer/demultiplexer 20 then separates the four signals at wavelengths $\lambda 1, \lambda 2, \lambda 3$, and $\lambda 4$ and outputs them from the output waveguides 23e.

On the other hand, the multiplexed optical waves at wavelengths $\lambda 5$ to $\lambda 12$ blocked by the filter 30 are directed via the branch waveguide 70 to the succeeding optical multiplexing/demultiplexing unit.

Our experiments showed that the loss at the center wavelength of each optical wave separated by the optical multiplexing/demultiplexing unit 11 was of the order of 4.5 dB±0.2 dB for all the four signals, providing excellent wavelength uniformity. Also, the loss of each optical wave output from the branch waveguide 70 of one optical multiplexing/demultiplexing unit could be reduced to a low value, of the order of 0.7 dB, at long and short wavelength ends of the main operating wavelength region.

Figure 2D:
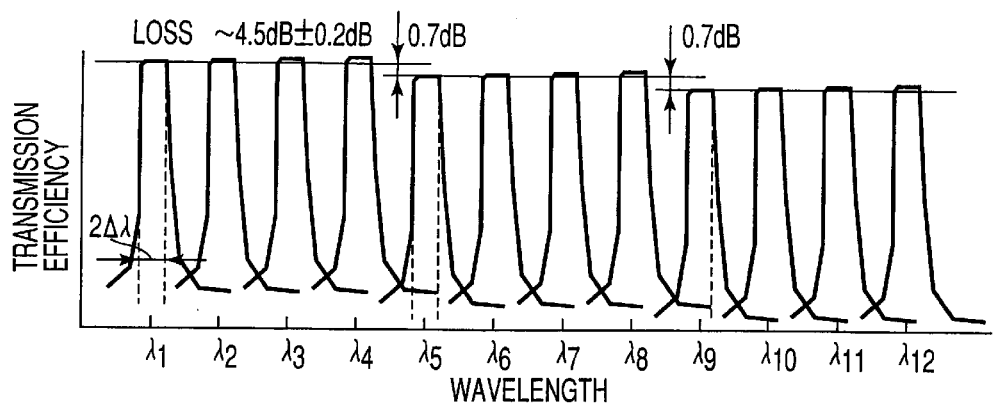
FIG. 2D shows the loss characteristic over the main operating wavelength region at each stage when the optical multiplexing/demultiplexing units 11 are connected in three stages.

FIG. 2D shows the loss characteristic over the main operating wavelength region at each stage when the optical multiplexing/demultiplexing units 11 are connected in three stages as shown in FIG. 1.

As shown in FIG. 2D, the loss of each of the four waves ($\lambda 1$ to $\lambda 4$) separated by the first-stage optical multiplexing/demultiplexing unit 11 is 4.5 dB as in FIG. 2B. The loss of each wave ($\lambda 5$ to $\lambda 8$) separated by the second-stage optical multiplexing/demultiplexing unit 11 is 5.2 dB. The loss of each wave ($\lambda 9$ to $\lambda 12$) separated by the third-stage optical multiplexing/demultiplexing unit 11 is 5.9 dB. That is, according to the optical multiplexing/demultiplexing apparatus of the present embodiment, the difference in output signal intensity between each stage can be limited to, at most, 1.4 dB between the first and third stages.

With the use of the AWG optical multiplexer/demultiplexer 20 capable of separating 125 channels, it becomes possible to separating 375 wavelengths in the examples of FIG. 1 in which three stage are connected. Insertion loss per stage is of the order of 4.5 dB and moreover the difference in light intensity level between the first and third stages can be suppressed to about 1.4 dB which is the same above.

Multiplexing/demultiplexing nearly 400 wavelengths with no variation in transmission loss and with low transmission loss was made feasible for the first time by present invention.

Of course, any AWG optical multiplexer/demultiplexer can be selectively used. With the use of an AWG optical multiplexer/demultiplexer capable of separating over 125 channels, more wavelengths could be handled. Conversely, it is also possible to use an AWG optical multiplexer/demultiplexer adapted for four channels by way of example. In addition, it is also possible to use AWG optical multiplexers/demultiplexers each adapted for a different number of channels in combination.

Next, the operation of the optical multiplexing/demultiplexing apparatus 10 in which a plurality of optical multiplexing/demultiplexing units 11 are connected in stages will be described in terms of two examples.

EXAMPLE 1

The light sources of optical waves used for optical communications are semiconductor lasers. In general, the oscillating wavelength of semiconductor lasers exists in the vicinity of the fundamental absorption end wavelength determined by the forbidden band width (Eg) of a semiconductor material that forms their active layer and ranges from the ultraviolet region to the infrared region of the electromagnetic spectrum including the visible region, depending on active layer materials (for example, GaAs-, AlGaAs-, InP-, GaInP-, AlGaInP-, and HgCdTe-based materials). However, the practicable wavelength range will be from 700 to 2000 nm taking the transmission efficiency (light transmission factor) of optical fibers as optical wave transmitting media into account.

The practicable wavelength range is from 1530 to 1610 nm (C band+L band). In example 1, therefore, use is made of a 50 GHz AWG whose wavelength range is 1530 to 1610 nm and channel spacing is 0.4 nm, and the total number of channels is set to 160 channels (40 channels×4 stages).

In this example, as the filter 30 use is made of a lowpass filter type of optical multiplexer/demultiplexer which outputs low frequency components from the input waveguide 40 the output waveguide 50. In this example, a band pass filter type of optical multiplexer/demultiplexer may be used instead.

In FIG. 1, multiplexed optical waves on 160-channels with wavelengths in the range of 1530 to 1610 nm are directed in the input waveguide 40 of the first-stage optical multiplexer/demultiplexer 10. The multiplexed optical waves are then directed to the filter 30 where the incoming optical waves are separated into optical waves on 40-channels in the range of 1530 to 1550 nm and optical waves on 120-channel in the other wavelength range (i.e., 1550 to 1610 nm in this example).

The optical waves on 40-channel in the wavelength range of 1530 to 1550 nm are directed through coupling waveguide 50 to AWG optical multiplexer/demultiplexer 20 where they are split into 40 individual waves each of a single wavelength, which in turn are directed trough output waveguides 55 to succeeding devices.

On the other hand, the optical waves on 120-channel in the wavelength range of 1550 to 1610 nm are directed through branch waveguide 70 and connecting fiber 9 to input waveguide 40 of second-stage optical multiplexer/demultiplexer 10.

In example 1, 160 optical waves each of a single wavelength are separated by four optical multiplexers/demultiplexers 10 adapted to separate wavelength ranges of 1530 to 1550 nm, 1550 to 1570 nm, 1570 nm 1590 nm, and 1590 to 1610 nm, respectively.

This example is arranged such that all the optical multiplexers/demultiplexers are identical except the lowpass filters and demultiplexres is performed in steps in units of 40 channels. However, the object of the present invention can also be achieved by the use of an optical multiplexer/demultiplexer in which different types of optical multiplexing/demultiplexing units are connected in stages and demultiplexing is performed step by step in different number of channels.

In this example, the 160-channel multiplexed optical waves are entered into input waveguide 40 and 160 optical waves each of a single wavelength are each output from a corresponding one of output waveguide 55, it is also possible to enter 160 optical waves of different wavelengths into output waveguides 55, then combine them into multiplexed optical waves and output them from the input waveguide 40.

EXAMPLE 2

The example 2 will be described next. This example is an extension of 1550 nm-band circuit for one channel to the existing 1310 nm-band circuits for four channels.

Figure 11:
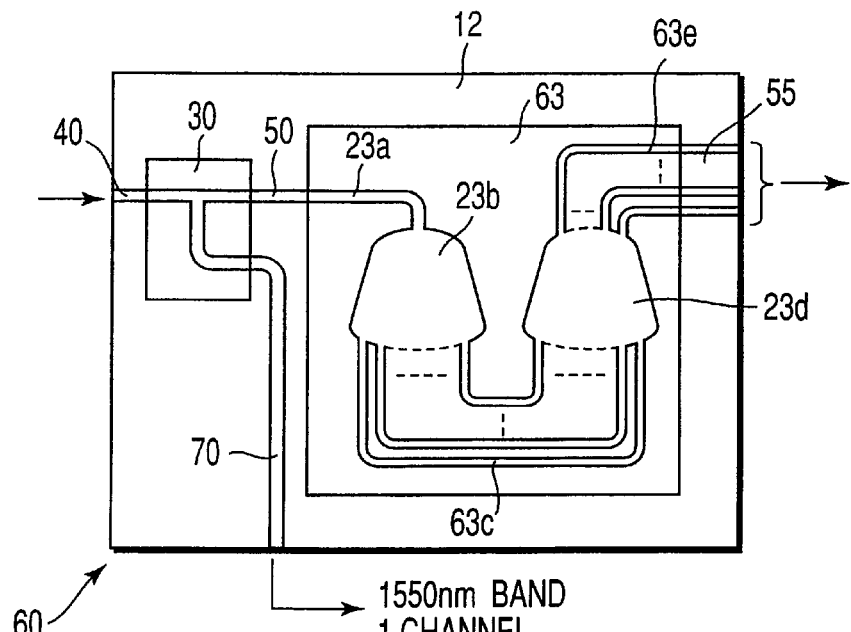
FIG. 11 is a diagram for use in explanation of a optical multiplexing/demultiplexing unit 60 according to a second embodiment.

FIG. 11 is a diagram for use in explanation of an optical multiplexing/demultiplexing unit 60 of the example 2. The optical multiplexing/demultiplexing unit 60 is identical in arrangement to the optical multiplexing/demultiplexing unit 11 shown in FIG. 2A except that its AWG optical multiplexer/demultiplexer 63 has four output waveguides 63e, and four output waveguides 55 and the filter 30 selects channels in the 1310 nm band.

A wavelength multiplexed signal containing four channels in the 1310 nm band and one channel in the 1550 nm band is directed to the input waveguide 40 of the optical multiplexing/demultiplexing unit 60. The multiplexed wave is separated by the filter 30 into a optical wave containing four channels in the 1310 nm band and a optical wave containing one channel in the 1550 nm band.

The optical wave containing four channels in the 1310 nm band is directed from the filter 30 through the coupling waveguide 50 to the AWG optical multiplexer/demultiplexer 63 where it is demultiplexed into individual waves (channels) each of a single wavelength, which are then output from the output waveguides. On the other hand, the optical wave containing one channel in the 1550 nm band is directed from the filter 30 through the branch waveguide 70 to a 1550-nm band optical receiver module not shown.

In the conventional optical multiplexing/demultiplexing system, there is the need of using an AWG optical multiplexer/demultiplexer capable of combining or separating optical waves of five channels or more, which is very uneconomical. However, the arrangement of FIG. 11 allows an economical channel expansion through the use of the existing AWG optical multiplexer/demultiplexer in which the number of output waveguides 63e is four. A further channel expansion can be carried out readily by connecting one or more optical multiplexing/demultiplexing units to the optical multiplexing/demultiplexing unit 60 shown in FIG. 11.

The optical multiplexing/demultiplexing unit 60 of the first embodiment provides the following advantages:

First, the number of channels that are combined or separated can be increased readily while ensuring interchannel crosstalk and insertion loss of substantially the same level as those in the conventional system. As a result, efficient utilization can be effected.

Second, the addition of some equipment allows the communication capacity to be increased without discarding existing facilities. That is, the communication scale can be expanded at low cost.

Third, the system of the present invention is made up from modules of the same configuration. Thus, the present system can be manufactured readily at low cost.

Fourth, since the AWG optical multiplexer/demultiplexers are used in the optical multiplexing/demultiplexing apparatus, 16 or more optical waves can be combined or separated at one stage.

[Second Embodiment]

The second embodiment is effective in adding channels in a wavelength band which is relatively greatly apart from a wavelength band in current use. In such a case, it may be difficult to cause the filter of each optical multiplexing/demultiplexing unit to demultiplex optical waves with accuracy for transmission to the succeeding unit. The reason is that the filter cannot have a sufficiently great amount of attenuation in wavelength bands greatly apart from its passband.

The second embodiment is directed to an optical multiplexing/demultiplexing apparatus expandable up to a sufficiently apart wavelength band. As a specific example, suppose the case where a 1300-nm band is added to a 1550-nm band.

Figure 12A:
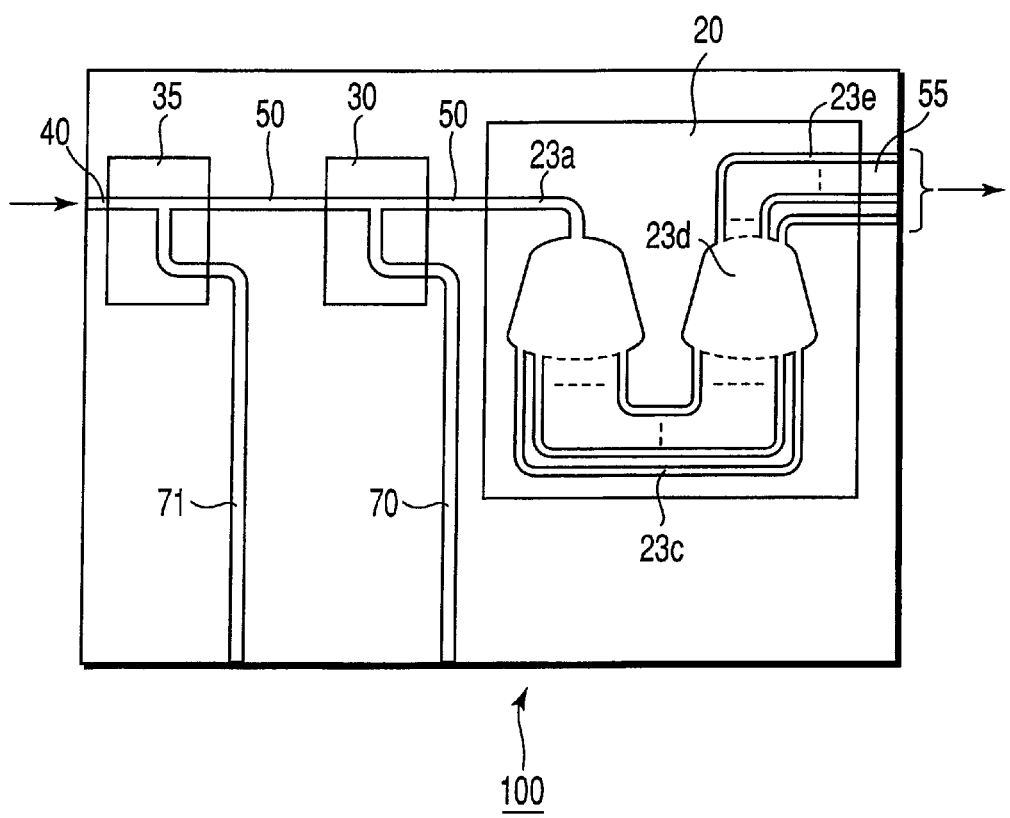
FIG. 12A shows a first-stage optical multiplexing/demultiplexing unit 100 of the optical multiplexing/demultiplexing apparatus of the second embodiment.

FIG. 12A shows the first-stage optical multiplexing/demultiplexing unit, generally indicated at 100, in the optical multiplexing/demultiplexing apparatus of the second embodiment. The optical multiplexing/demultiplexing unit is characterized in that the filter 35 is followed by a second filter 30.

Figure 13A:
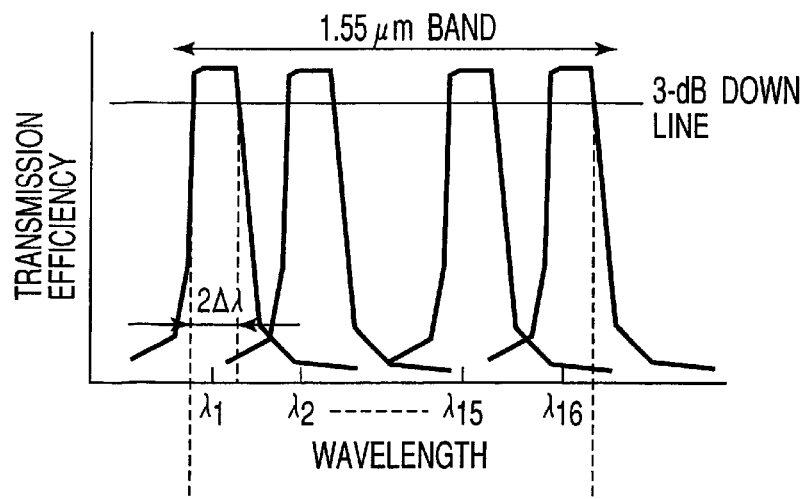
FIG. 13A shows the wavelength characteristic of optical waves separated by the AWG optical multiplexer/demultiplexer 20.

In FIG. 12A, the AWG optical multiplexer/demultiplexer 20 combines or separates waves corresponding to 16 consecutive channels in the 1550 nm band. The wavelength characteristic of optical waves separated by the AWG optical multiplexer/demultiplexer 20 is shown in FIG. 13A.

Figure 13B:
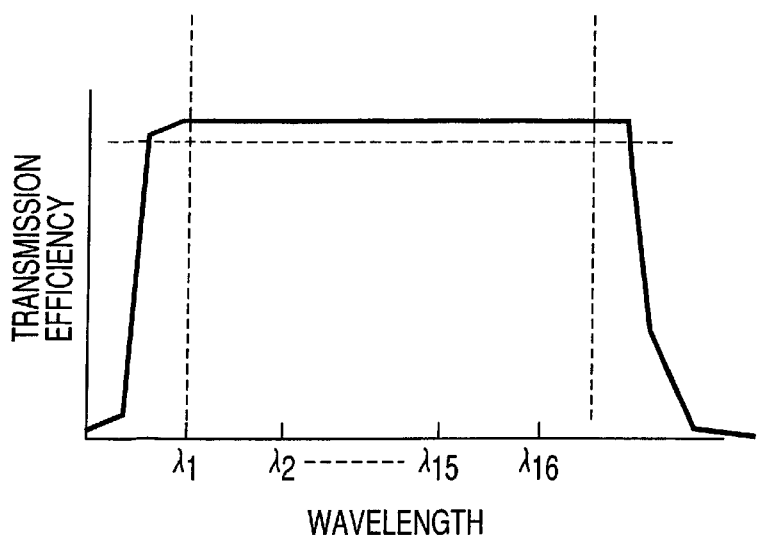
FIG. 13B shows the wavelength characteristic of the filter 30 shown in FIG. 12B.
Figure 13C:
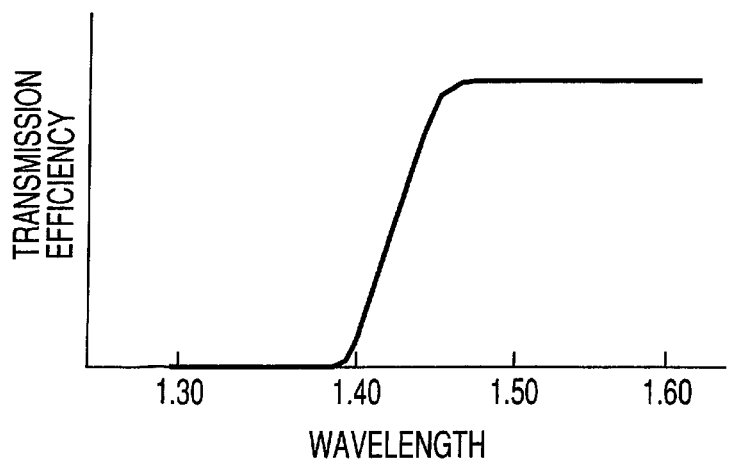
FIG. 13C shows the wavelength characteristic of the highpass filter 35.

The second filter 30 has such a passband characteristic as shown in FIG. 13B. The first filter 35 is a highpass filter having the cutoff wavelength in the vicinity of 1400 nm as shown in FIG. 13C.

The operation of the optical multiplexing/demultiplexing unit 100 will be described next with reference to FIG. 12B.

In FIG. 12B, first, a wavelength multiplexed wave which, in addition to 16 waves ($\lambda 1$ to $\lambda 16$) corresponding to 16 consecutive channels in the 1550-nm band, further contains 16 waves ($\lambda 17$ to $\lambda 32$) corresponding to 16 consecutive channels in the 1550-nm band and eight waves in the 1300-nm band is input to the filter 35 via the input waveguide 40.

In the filter 35, the multiplexed wave is split into a first multiplexed optical wave containing 32 consecutive waves ($\lambda 1$ to $\lambda 32$) in the 1550-nm band and a second multiplexed optical wave containing eight waves in the 1300-nm band.

The first multiplexed optical wave is allowed to pass through the filter 35 and then enter the second filter 30. On the other hand, the second multiplexed optical wave is not allowed to pass through the filter 35 and is directed via a first branch waveguide 71 to an optical multiplexing/demultiplexing unit 102 adapted for the 1300-nm band.

The wavelength multiplexed wave directed to the second filter 30 is separated into multiplexed wave containing 16 waves ($\lambda 1$ to $\lambda 16$) corresponding to consecutive 16 channels in the 1550-nm band and multiplexed wave containing 16 waves ($\lambda 17$ to $\lambda 32$) corresponding to consecutive 16 channels in the 1550-nm band. For example, the 16 waves ($\lambda 1$ to $\lambda 16$) in the 1550-nm band are allowed to pass through the second filter 30 and then enter the AWG optical multiplexer/demultiplexer 20. On the other hand, the 16 consecutive waves ($\lambda 17$ to $\lambda 32$) in the 1550-nm band are not allowed to pass through the second filter 30 and are directed via a second branch waveguide 70 to an optical multiplexing/demultiplexing unit 101 adapted for the waves ($\lambda 17$ to $\lambda 32$) in the 1550-nm band.

Such a configuration ensures easy expansion even if an expansion wavelength band is greatly apart from that associated with the existing device.

[Third Embodiment]

The inventive optical multiplexing/demultiplexing apparatus implements expandable optical multiplexing/demultiplexing by hierarchically connecting optical multiplexing/demultiplexing units each using an AWG optical multiplexer/demultiplexer and a preceding filter in combination. In expanding the available wavelength band using multiple optical multiplexing/demultiplexing units, the AWG optical multiplexer/demultiplexers used in each unit differ from one another in their operating wavelength band. Thus, preparations must be made for a plurality of AWG optical multiplexer/demultiplexers that differ in operating wavelength band, which may result in increased manufacturing cost.

Figure 14:
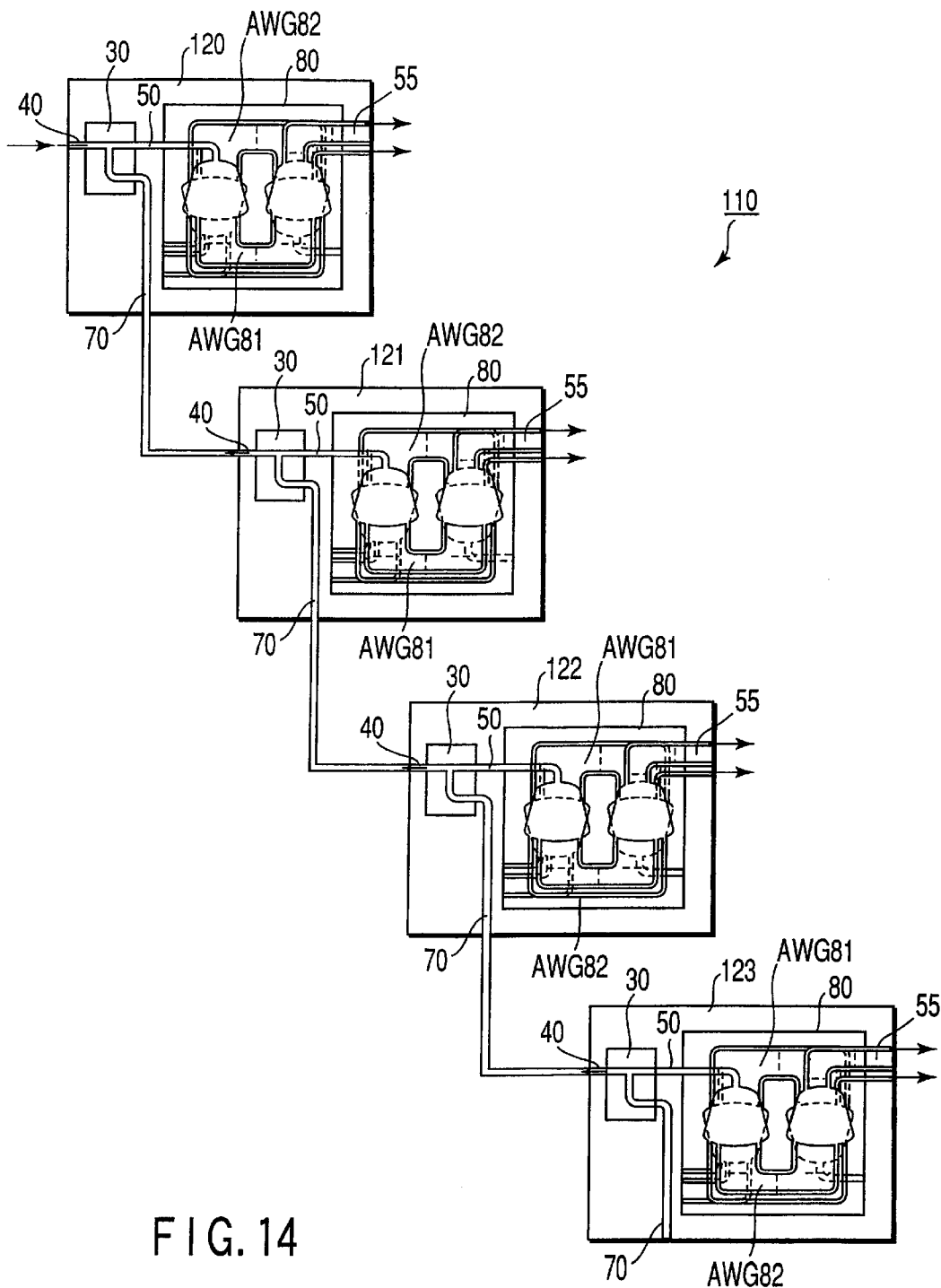
FIG. 14 shows an optical multiplexer/demultiplexer of the AWG type 80 in which a first AWG waveguide 81 and a second AWG waveguide 82 are cross-arranged.

In FIG. 14, there is shown an optical multiplexing/demultiplexing apparatus 110 according to the third embodiment which is intended to solve the above problem. Each optical multiplexing/demultiplexing unit 120123 included in the optical multiplexing/demultiplexing apparatus 110 uses an AWG chip formed with multiple AWGs differing in operating wavelength band. In FIG. 14, there is illustrated an AWG optical multiplexer/demultiplexer 80 in which a first AWG 81 and a second AWG 82 are cross arranged. In this embodiment, it is assumed that the operating wavelength band of the first AWG 81 is from $\lambda 1$ to $\lambda 16$ and the operating wavelength band of the second AWG 82 is from $\lambda 17$ to $\lambda 32$.

The use of such optical multiplexing/demultiplexing units, each of which comprises AWG optical multiplexer/demultiplexer 80 in which a first AWG 81 and a second AWG 82 are cross arranged, provides great wavelength expandability using one kind of AWG optical multiplexer/demultiplexer 80 as shown in FIG. 14. In FIG. 14, the first-stage AWG optical multiplexing/demultiplexing unit 120 is assumed to use 8-wave AWG whose main operating wavelength band is, for example, $\lambda 1$ to $\lambda 8$. For this reason, the filter 30 in the unit 120 is a bandpass filter that allows the main operating wavelength band, $\lambda 1$ to $\lambda 8$, to pass through. The second-stage AWG optical multiplexing/demultiplexing unit 121 uses 8-wave AWG whose main operating wavelength band ranges, for example, from $\lambda 9$ to $\lambda 16$. Thus, the passband of the filter 30 in the second-stage unit 121 ranges from $\lambda 9$ to $\lambda 16$.

For further expansion, the second AWG 82 of the two AWGs provided in the AWG optical multiplexer/ demultiplexer 80 is simply used. The optical multiplexing/demultiplexing apparatus 110 shown in FIG. 14 is expanded to four stages through the use of branch waveguides 70. The unit 122 uses AWG 82 whose main operating wavelength range is $\lambda 17$ to $\lambda 24$ and the filter 30 is a bandpass filter which allows $\lambda 17$ to $\lambda 24$ to pass through. The unit 123 uses AWG 82 whose main operating wavelength range is $\lambda 25$ to $\lambda 32$ and the filter is a bandpass filters which allows $\lambda 25$ to $\lambda 32$ to pass through. Further expansion is allowed by further connecting lower stages as required.

According to the above-described configuration, expandability over broad wavelength band can be realized at low cost by making an optical multiplexing/demultiplexing apparatus from multiple optical multiplexing/demultiplexing units each having multiple AWGs different in operating wavelength band.

[Fourth Embodiment]

The fourth embodiment performs the same function as each of the first to three embodiments, but differs in structure. That is, each optical multiplexing/demultiplexing unit comprising an optical multiplexer/demultiplexer of this embodiment is monolithically integrated on a single silicon chip.

Figure 15:
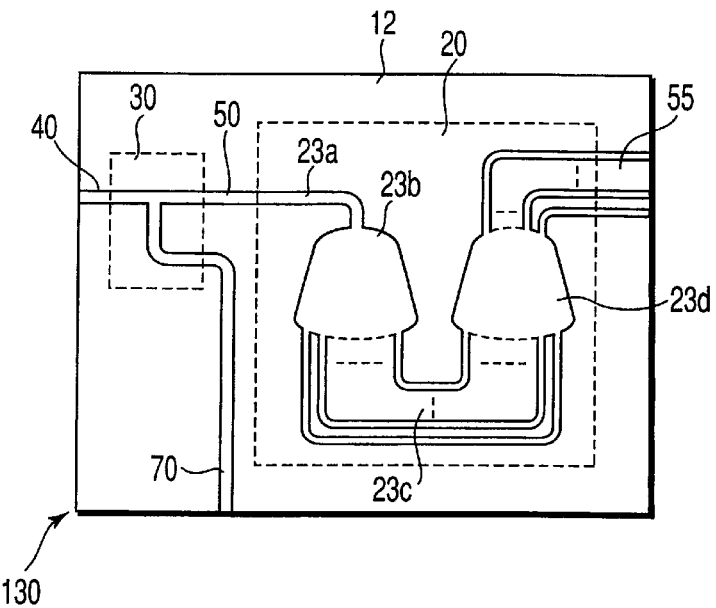
FIG. 15 is a top view of a optical multiplexing/demultiplexing unit 130 according to a fourth embodiment.

FIG. 15 is a top view of an optical multiplexing/demultiplexing unit 130. To indicate the correspondence with FIG. 2A, in FIG. 15, the filter 30 and the AWG optical multiplexer/demultiplexer 20 are each shown encircled with dotted lines. As described above, the optical multiplexing/demultiplexing unit 130 is monolithically integrated on a single silicon chip. The side view of the optical multiplexing/demultiplexing unit 130 remains unchanged from FIG. 4.

The optical multiplexing/demultiplexing unit 130 is manufactured by the following process. A lower cladding layer 22 consisting of $SiO_2$ is formed on a silicon substrate 21 and a core layer consisting of germanium-doped $SiO_2$ is formed on the lower cladding layer. Naturally, the refractive index of the core layer 23 is greater than that of the lower cladding layer 22.

After that, the core layer 23 is subjected to patterning as shown in FIG. 15 and an upper cladding layer 24 is then formed which consists of $SiO_2$ as with the lower cladding layer 22.

In the optical multiplexing/demultiplexing unit 130 thus formed, there is no optical connection point between each component and each waveguide is formed in the continuous integrated form. Therefore, optical waves can be propagated with low attenuation.

To use an interference film filter optical multiplexing/demultiplexing circuit for the filter 30, it is required to provide a dielectric interference film perpendicularly to the optical waveguide. In this case, the dielectric interference film is guided to the waveguide using a jig while allowing it to fall by its weight and then glued to the waveguide vertically with very high accuracy. This embodiment is the same as the first embodiment.

In this embodiment, the optical multiplexing/demultiplexing unit 130 is configured to comprise the single core layer 23 integrating each components monolithically, shown in FIG. 15, but is not limited to the configuration of the optical multiplexing/demultiplexing unit 130. For example, the optical multiplexing/demultiplexing unit 130 may be configured to comprise a plurality of core layers each of which integrates the components monolithically. Furthermore, it is not necessary to integrates the all components in the single core layer 23. That is, a part of the components, for example, the optical multiplexer/demultiplexer 20 or the like, may be integrated monolithically in the core layer 23 and each of the other components, for example the filter 30, the branch waveguide 70 or the like, may be arranged as a individual device.

The present invention has been described in terms of the preferred embodiments, but is not limited to the embodiments. The present invention may be carried out in other forms without departing from the scope and sprit thereof.

For example, in the above embodiments, when optical multiplexing/demultiplexing units are connected in stages to expand the available operating wavelength region, lossy wavelength regions may occur, depending on the filter or AWG optical multiplexer/demultiplexer used. This will be described with reference to FIGS. 16A, 16B, 17A and 17B taking, as an example, an optical multiplexing/demultiplexing apparatus in which an optical multiplexing/demultiplexing unit whose operating wavelength band is from $\lambda 1$ to $\lambda 4$ is followed by an optical multiplexing/demultiplexing unit whose operating wavelength band is from $\lambda 5$ to $\lambda 8$.

Figure 16A:
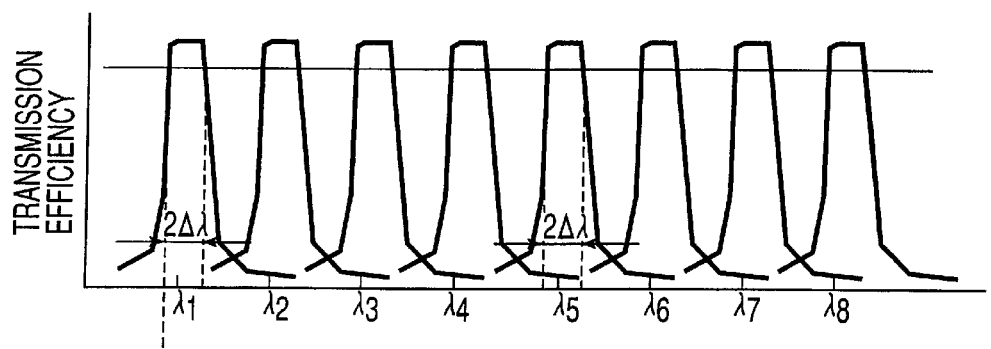
Figure 16B:
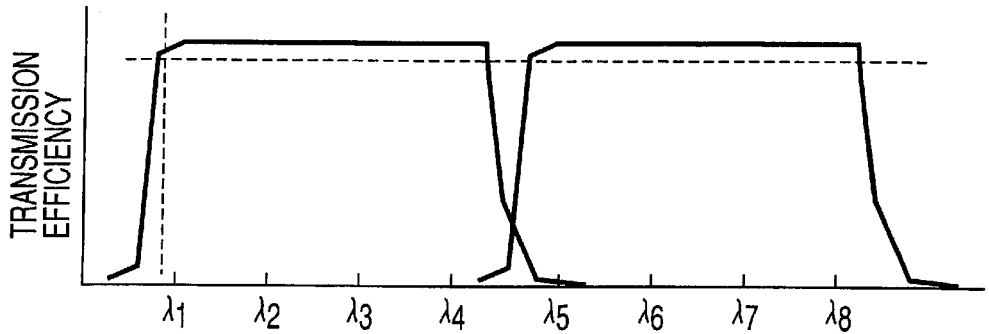

FIG. 16A shows the wavelength characteristic of each AWG optical multiplexer/demultiplexer in the preceding and succeeding optical multiplexing/demultiplexing units. FIG. 16B shows the wavelength characteristic ($\lambda 1$ to $\lambda 4$) of the filter in the preceding optical multiplexing/demultiplexing unit and the wavelength characteristic ($\lambda 5$ to $\lambda 8$) of the filter in the succeeding optical multiplexing/demultiplexing unit.

As shown in FIG. 16B, the characteristic of each filter changes sharply between the highest channel separated by the preceding optical multiplexing/demultiplexing unit and the lowest channel separated by the succeeding optical multiplexing/demultiplexing unit (i.e., between $\lambda 4$ and $\lambda 5$). In such a case, no lossy wavelength region occurs in the two optical multiplexing/demultiplexing units, so that the channels can be used consecutively.

When AWG optical multiplexer/demultiplexers having the wavelength characteristic shown in FIG. 16A and filters having the wavelength characteristic shown in FIG. 17B are combined to form the preceding and succeeding optical multiplexing/demultiplexing units, on the other hand, lossy wavelength regions will occur in the two optical multiplexing/demultiplexing units.

That is, as shown in FIG. 17B, each of the preceding and succeeding filters has a characteristic such that the transmission factor changes in the region from $\lambda 4$ to $\lambda 6$. Thus, in the preceding and succeeding optical multiplexing/demultiplexing units, loss is high in the wavelength region in the vicinity of $\lambda 5$, disabling proper demultiplexing.

In such a case, an additional wavelength is simply set by keeping a given spacing between the operating wavelength bands of the preceding and succeeding optical multiplexing/demultiplexing units rather than consecutively adding the wavelength band of the succeeding optical multiplexing/demultiplexing unit to the wavelength band of the preceding optical multiplexing/demultiplexing unit. For example, as shown in FIG. 17A, it is recommended that the wavelength $\lambda 5$ be skipped and an optical multiplexing/demultiplexing unit having an operating wavelength region of $\lambda 6$ to $\lambda 9$ be used anew.

According to the above concept, wavelength expansion can be realized with more flexibility. For example, 16 wavelengths can be selected from 1.51 $\mu$m band for the preceding optical multiplexing/demultiplexing unit, and eight wavelengths can be selected from 1.55 $\mu$m band for the succeeding optical multiplexing/demultiplexing unit. An optical multiplexing/demultiplexing apparatus having such a configuration will allow for expansion not only to a wavelength band contiguous to the initially used wavelength band but also to a wavelength band apart therefrom.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical multiplexing/demultiplexing unit used in an optical communication system having one or more such units, comprising:
    a first waveguide configured to input a first optical wave in which a plurality of wavelengths corresponding to multiple channels are multiplexed;
    a first filter connected with the first waveguide, said first filter configured to separate the first optical wave from the first waveguide into a second optical wave in a first wavelength band and a third optical wave in a second wavelength band; the second optical wave including adjacent wavelengths in a part of the plurality of wavelengths and the third optical wave including adjacent wavelengths in the other part of the plurality of wavelengths;
    a second filter connected with the first filter, said second filter configured to separate the second optical wave from the first filter into a fourth optical wave in a third wavelength band and a fifth optical wave in a fourth wavelength band; the fourth optical wave including adjacent wavelengths in a part of the plurality of wavelengths of the second optical wave and the fifth optical wave including adjacent wavelengths in the other part of the plurality of wavelengths of the second optical wave;
    an optical-demultiplexer adapted to demultiplex the third optical wave into optical waves each of a single wavelength;
    a second waveguide connected with the second filter, said second waveguide directing the fourth optical wave to a succeeding unit; and
    a third waveguide connected with the second filter, said third waveguide directing the fifth optical wave to a succeeding unit.

2. The optical multiplexing/demultiplexing unit according to claim 1, wherein the optical-demultiplexer is an arrayed waveguide grating circuit.

3. The optical multiplexing/demultiplexing unit according to claim 1, wherein each of the first and second filter is one of a highpass filter type of optical multiplexer/demultiplexer, a lowpass filter type of optical multiplexer/demultiplexer, and a bandpass filter type of optical multiplexer/demultiplexer.

4. An optical multiplexing/demultiplexing unit used in an optical communication system having one or more such units, comprising:
    a substrate;
    a first cladding layer stacked on said substrate;
    a core layer stacked on said first cladding layer; and
    a second cladding layer stacked on said core layer,
    wherein said core layer includes:
        a first waveguide configured to input a first optical wave in which a plurality of wavelengths corresponding to multiple channels are multiplexed;
        a filter connected with the first waveguide, said filter being configured to separate the first optical wave from the first waveguide into a second optical wave in a first wavelength band and a third optical wave in a second wavelength band; the second optical wave including adjacent wavelengths in a part of the plurality of wavelengths and the third optical wave including adjacent wavelengths in the other part of the plurality of wavelengths;
        an optical-demultiplexer adapted to demultiplex the second optical wave into optical waves each of a single wavelength; and
        a second waveguide connected with the filter, said second waveguide being configured to direct the third optical wave to a succeeding unit.

5. An optical multiplexing/demultiplexing apparatus comprising:
    a plurality of optical multiplexing/demultiplexing units connected hierarchically, said plurality of optical multiplexing/demultiplexing units being adapted to operate in different operating wavelength bands;
    each of the optical multiplexing/demultiplexing units comprising:
        a first waveguide configured to input a first optical wave in which a plurality of wavelengths corresponding to multiple channels are multiplexed;
        a filter connected with the first waveguide and configured to separate the first optical wave from the first waveguide into a second optical wave in a first wavelength band and a third optical wave in a second wavelength band; the second optical wave including adjacent wavelengths in a part of the plurality of wavelengths and the third optical wave including adjacent wavelengths in the other part of the plurality of wavelengths;
        an optical-demultiplexer adapted to demultiplex the second optical wave into optical waves each of a single wavelength; and
        a second waveguide connected with the filter, said second waveguide being configured to direct the third optical wave to a succeeding unit.

6. The optical multiplexing/demultiplexing apparatus according to claim 5, wherein the optical-demultiplexer is an arrayed waveguide grating circuit.

7. The optical multiplexing/demultiplexing apparatus according to claim 5, wherein the filter is one of a high-pass filter type of an optical multiplexer/demultiplexer, a low-pass filter type of an optical multiplexer/demultiplexer, and a bandpass filter type of an optical multiplexer/demultiplexer.

8. The optical muitiplexing/demultiplexing apparatus according to claim 5, wherein the optical multiplexing/demultiplexing units are connected in the order of operating wavelength band beginning with the shortest or longest wavelength band.

9. The optical multiplexing/demultiplexing apparatus according to claim 5, wherein the optical-demultiplexer comprises a plurality of optical multiplexing/demultiplexing circuits, each of said plurality of optical multiplexing/demultiplexing circuits are configured to operate in different wavelength bands.

10. An optical multiplexing/demultiplexing apparatus comprising:
    a plurality of optical multiplexing/demultiplexing units connected hierarchically, said plurality of optical multiplexing/demultiplexing units being adapted to operate in different operating wavelength bands;

each of the optical multiplexing/demultiplexing units comprising:
- a first waveguide configured to input a first optical wave in which a plurality of wavelengths corresponding to multiple channels are multiplexed;
- a first filter connected with the first waveguide and configured to separate the first optical wave from the first waveguide into a second optical wave in a first wavelength band and a third optical wave in a second wavelength band; the second optical wave including adjacent wavelengths in a part of the plurality of wavelengths and the third optical wave including adjacent wavelengths in the other part of the plurality of wavelengths;
- a second filter connected with the first filter, said second filter configured to separate the second optical wave from the first filter into a fourth optical wave in a third wavelength band and a fifth optical wave in a fourth wavelength band; the fourth optical wave including adjacent wavelengths in a part of the plurality of wavelengths of the second optical wave and the fifth optical wave including adjacent wavelengths in the other part of the plurality of wavelengths of the second optical wave;
- an optical-demultiplexer adapted to demultiplex the third optical wave into optical waves each of a single wavelength;
- a second waveguide connected with the second filter, said second waveguide being configured to direct the fourth optical wave to a succeeding unit; and
- a third waveguide connected with the second filter, said third waveguide being configured to direct the fifth optical wave to a succeeding unit.

11. The optical multiplexing/demultiplexing apparatus according to claim 10, wherein the optical-demultiplexer is an arrayed waveguide grating circuit.

12. The optical multiplexing/demultiplexing apparatus according to claim 10, wherein the first filter or the second filter is one of a high-pass filter type of an optical multiplexer/demultiplexer, a low-pass filter type of an optical multiplexer/demultiplexer, and a bandpass filter type of an optical multiplexer/demultiplexer.

13. The optical multiplexing/demultiplexing apparatus according to claim 10, wherein the optical multiplexing/demultiplexing units are connected in the order of operating wavelength band beginning with the shortest or longest wavelength band.

14. The optical multiplexing/demultiplexing apparatus according to claim 10, wherein the optical-demultiplexer comprises a plurality of optical multiplexing/demultiplexing circuits, each of said plurality of multiplexing/demultiplexing units is configured to operated in a different wavelength band.

15. An optical multiplexing/demultiplexing apparatus in which a plurality of optical multiplexing/demultiplexing units operating in different wavelength bands are connected hierarchically, each of said optical multiplexing/demultiplexing units comprising:
- a first waveguide configured to input a first optical wave in which a plurality of wavelengths corresponding to multiple channels are multiplexed;
- a filter connected with the first waveguide and configured to separate the first optical wave from the first waveguide into a second optical wave in a first wavelength band and a third optical wave in a second wavelength band; the second optical wave including adjacent wavelengths in a part of the plurality of wavelengths and the third optical wave including adjacent wavelengths in the other part of the plurality of wavelengths;
- an optical-demultiplexer adapted to demultiplex the second optical wave into optical waves each of a single wavelength; and
- a second waveguide connected with the filter and configured to direct the third optical wave to a succeeding unit.

16. A method of demultiplexing an incident wavelength multiplexed optical wave into different wavelength bands comprising:
- separating the first optical wave from the first waveguide into a second optical wave in a first wavelength band and a third optical wave in a second wavelength band; the second optical wave including adjacent wavelengths in a part of the plurality of wavelengths and the third optical wave including adjacent wavelengths in the other part of the plurality of wavelengths;
- demultiplexing the second optical wave into optical waves each of a single wavelength; and
- directing the third optical wave for further processing.

17. A method of demultiplexing an incident wavelength multiplexed optical wave into different wavelength bands comprising:
- separating the first optical wave from the first waveguide into a second optical wave in a first wavelength band and a third optical wave in a second wavelength band; the second optical wave including adjacent wavelengths in a part of the plurality of wavelengths and the third optical wave including adjacent wavelengths in the other part of the plurality of wavelengths;
- separating the second optical wave in the first wavelength band from the first filter into a fourth optical wave in a third wavelength band and a fifth optical wave in a fourth wavelength band; the fourth optical wave including adjacent wavelengths in a part of the plurality of wavelengths of the second optical wave and the fifth optical wave including adjacent wavelengths in the other part of the plurality of wavelengths of the second optical wave;
- demultiplexing the third optical wave into optical waves each of a single wavelength; and
- directing the fourth optical wave and the fifth optical wave for further processing.

18. An optical multiplexing/demultiplexing unit used in an optical communication system having one or more such units, comprising;
- a first waveguide configured to input a first optical wave in which a plurality of wavelengths corresponding to multiple channels are multiplexed;
- a filter connected with the first waveguide, said filter being configured to separate the first optical wave from the first waveguide into a second optical wave in a first wavelength band and a third optical wave in a second wavelength band; the second optical wave including adjacent wavelengths in a part of the plurality of wavelengths and the third optical wave including adjacent wavelengths in the other part of the plurality of wavelengths;
- an optical-demultiplexer adapted to demultiplex the second optical wave into optical waves each of a single wavelength; and a second waveguide connected with the filter, said second waveguide being configured to direct the third optical wave to a succeeding unit.

19. The optical multiplexing/demultiplexing unit according to claim 18, wherein the optical-demultiplexer comprises a plurality of optical multiplexing/demultiplexing circuits, each of said plurality of optical multiplexing/demultiplexing circuits operates in a different wavelength band.

20. The optical multiplexing/demultiplexing unit according to claim 18, wherein the optical-demultiplexer is an arrayed waveguide grating circuit.

21. The optical multiplexing/demultiplexing unit according to claim 18, wherein the filter is one of a high-pass filter type of an optical multiplexer/demultiplexer, a low-pass filter type of an optical multiplexer/demultiplexer, and a bandpass filter type of an optical multiplexer/demultiplexer.

* * * * *